United States Patent [19]

Bustamante et al.

[11] Patent Number: 4,752,967
[45] Date of Patent: Jun. 21, 1988

[54] POWER CONTROL SYSTEM FOR SATELLITE COMMUNICATIONS

[75] Inventors: Herman A. Bustamante, Cupertino; John A. Lemon, San Jose, both of Calif.; Harry J. Stapor, West Melbourne, Fla.

[73] Assignees: Tandem Computers Incorporated, Cupertino, Calif.; Harris Corporation, Melbourne, Fla.

[21] Appl. No.: 803,042

[22] Filed: Nov. 29, 1985

[51] Int. Cl.$^4$ .............................................. H04B 7/185
[52] U.S. Cl. ........................................ 455/12; 455/52; 455/69; 455/10
[58] Field of Search ....................... 455/12, 52, 69, 63, 455/10; 370/69.1, 75

[56] References Cited

U.S. PATENT DOCUMENTS

| | | |
|---|---|---|
| 3,315,164 | 4/1967 | Fergusion, Jr. et al. ............. 455/69 |
| 4,004,224 | 1/1977 | Arens et al. ........................... 455/10 |
| 4,038,600 | 7/1977 | Thomas ................................. 455/12 |
| 4,228,538 | 10/1980 | Scharla-Nielsen et al. .......... 455/12 |
| 4,261,054 | 4/1981 | Scharle-Nielsen .................... 455/12 |

OTHER PUBLICATIONS

"Up-Link Power Control Experiment," IEEE Transactions on Broadcasting, vol. BC-28, No. 4, Dec., 1982, by Minoru Yamamoto et al. (pp. 157-159).

Primary Examiner—Jin F. Ng
Attorney, Agent, or Firm—Townsend and Townsend

[57] ABSTRACT

A system for compensating for varying attenuation of an uplink signal from a local node to a satellite. The system monitors two beacon signals and the local downlink signal to determine fade. An error signal, indicating the uplink fade, is generated and utilized to adjust the gain of the uplink transmitter to compensate for the fade.

8 Claims, 6 Drawing Sheets

```
IF GOING^UP THEN
    BEGIN                !LAST USED UP^VALUES
    IF UPLINK^FADE > UPCCB.LAST^FADE THEN
        BEGIN            !FADE STILL INCREASING
        OFFSET^VALUE: = UP^VALUES[UPLINK^FADE];
        END
    ELSE
        BEGIN            !FADE REVERSED; NOW DECREASING
        IF NOT UP^VALUES[UPLINK^FADE] THEN
            BEGIN        !STAY ON UP^VALUES TO KEEP SIGNAL LEVEL STEADY
            OFFSET^VALUE: = UP^VALUES[UPLINK^FADE];
            END
        ELSE
            BEGIN        !SWITCH TO DOWN^VALUES
            OFFSET^VALUE: = DOWN^VALUES[UPLINK^FADE];
            GOING^UP: = 0;
            END
        END;
    END
ELSE
    BEGIN                !LAST USED DOWN^VALUES
    IF UPLINK^FADE < UPCCB.LAST^FADE THEN
        BEGIN            !FADE STILL DECREASING
        OFFSET^VALUE: = DOWN^VALUES[UPLINK^FADE];
        END
    ELSE
        BEGIN            !FADE REVERSED; NOW INCREASING
        IF NOT DOWN^VALUES[UPLINK^FADE] THEN
            BEGIN        !STAY ON DOWN^VALUES TO KEEP SIGNAL LEVEL STEADY
            OFFSET^VALUE: = DOWN^VALUES[UPLINK^FADE];
            END
        ELSE
            BEGIN        !SWITCH TO UP^VALUES
            OFFSET^VALUE; = UP^VALUES[UPLINK^FADE];
            GOING^UP: = 1;
            END
        END
    END
RFTCB.POWER^OFFSET: = RFTCB.POWER^OFFSET + OFFSET^VALUE;
UPCCB.LAST^FADE: = UPLINK^FADE;
```

SOFTWARE IMPLEMENTATION OF HYSTERESIS FUNCTION

POWER CONTROL SYSTEM FOR SATELLITE COMMUNICATIONS

BACKGROUND OF THE INVENTION

1. Field of the Invention

The present invention relates generally to satellite communication systems and, more particularly, relates to an apparatus and method of power control to compensate for the effects of varying uplink signal attenuation, whatever their source. In the following description the invention and its operation are presented on the basis of varying uplink attenuation due to rain fall.

2. Description of the Relevant Art

A satellite communication system generally includes a satellite and several ground stations or nodes. The system is a frequency division multiplexed system for providing signal paths between various nodes via the satellite. A signal path includes an uplink, which is a signal transmitted from one node to the satellite at a given frequency in the frequency multiplexed communication system, and a downlink, which is the uplink signal frequency translated, power amplified and retransmitted by the satellite to the nodes in the communication system. The satellite has a transponder on board for receiving the uplink signals and transforming these signals into the downlink signals. Given a nominal operating point of the satellite transponder, variation in output, or downlink, power of a signal are very nearly equal to the variation to the input, or uplink, power of that signal. Once the nominal operating point has been selected, the downlink power of a particular signal is equal to the uplink power of that particular signal multiplied by a constant $G_s$. Thus, the downlink power is controlled by the uplink power. The transponder in the satellite is characterized by a fixed total power limitation, $P_s$, on the power that may be transmitted into the various downlink signals in the frequency multiplexed system.

A design problem common to the above-described satellite communication system is the allocation of the limited power, $P_s$, of the satellite transponder between the various downlink signals. The design goal of the satellite communication system is to transmit the maximum possible number of downlink signals at any given time. One particular problem in such a satellite communication system is the attenuation of the uplink and downlink signals due to rain or other atmospheric conditions. A rain condition at a given node attenuates the uplink signal transmitted by the node and the downlink signals received by the node.

The attenuation of the downlink signal may cause the power of the downlink signal to be decreased to a level where extraction of the information contained in the downlink signal is precluded. Thus, the information contained within the downlink signal may be lost to the nodes, thereby causing a serious disruption in the communication system. To prevent this disruption, the nominal operating input/output power conditions at the satellite are established to guarantee operations of the downlink up to some maximum attenuation level including rain fade.

On the other hand, the attenuation of the uplink signal from the node during a rain condition may also cause the power of the downlink signal to the nodes in the system to be decreased, below the minimal downlink power level described above. This decrease is due to the nature of the transponder on board the satellite. Since the power of the downlink signal is a multiple of the power of the uplink signal, the attenuation of the uplink signal will decrease the power of the downlink signal. This decrease in the power of the downlink signal can result in the inability of the various nodes to extract the information carried by the signal from the transmitting local node and relayed by the satellite to a receiving node.

Presently, a rain condition at a node frequently shuts down the node since the uplink signal cannot penetrate the rain. If the uplink signal power was fixed at a level sufficient to burn through the rain then, in the absence of rain, the resulting downlink power would consume a large fraction of the total transponder transmit power, $P_s$.

Accordingly, a system that compensates for atmospheric attenuation while allocating power among the various signals in the frequency multiplexed satellite communication system to maximize the information handling capacity of the system is greatly needed.

SUMMARY OF THE INVENTION

The present invention is a system and apparatus for compensating for uplink fade at a local node, L1, due to atmospheric attenuation so that the limited power of a satellite transponder may be distributed across the various signals of a frequency multiplexed satellite communication system to optimize the information handling capacity of the system.

In the present system the power of the uplink signal at a local node, L1, is set so that, under clear sky conditions, the power of the retransmitted downlink, TP(L12), is sufficient to overcome rain attenuation at nodes selected to receive the downlink signal. However, during a rain condition at L1, the power level of the uplink signal measured at the satellite input will be attenuated by the rain. The downlink power is equal to the gain, $G_s$, of the transponder on board the satellite times the received power of the uplink signal. Since the power of the uplink signal is decreased, the power of the downlink signal is also decreased and the downlink signal will be lost at nodes experiencing excessive rain conditions.

In the present invention, node L1, receives its own downlink signal and it also receives a beacon downlink signal. The beacon downlink signal may be the downlink signal in a beacon signal path from a beacon node, located at a geographic site with a low probability of rainfall, to the local node.

The received power of uplink signal is essentially constant because of this lack of rainfall and, thus, the transmitted power of the beacon downlink signal is essentially constant and is used as a reference to measure downlink attenuation. The node L1 includes apparatus to measure the difference between the long term and short term average power of the received beacon downlink signal and of its own downlink signal.

Logical circuitry at L1 calculates an error signal based on these difference measurements. The error signal is a measure of the attenuation of the uplink from L1 to the satellite.

In one embodiment, a control unit is included that utilizes the error signal to adjust the gain of the transmitter at L1 to compensate for uplink fade. This compensation maintains the received power level of the uplink at the satellite at about a constant level thereby maintaining the downlink power at a constant level during a rain condition.

DETAILED DESCRIPTION OF THE PREFERRED EMBODIMENTS

The present invention is a system for allocation of available satellite downlink power among transmitted signals, in real time, as required to compensate for variations in atmospheric attenuation at nodes in the satellite communication system.

Figure 1:
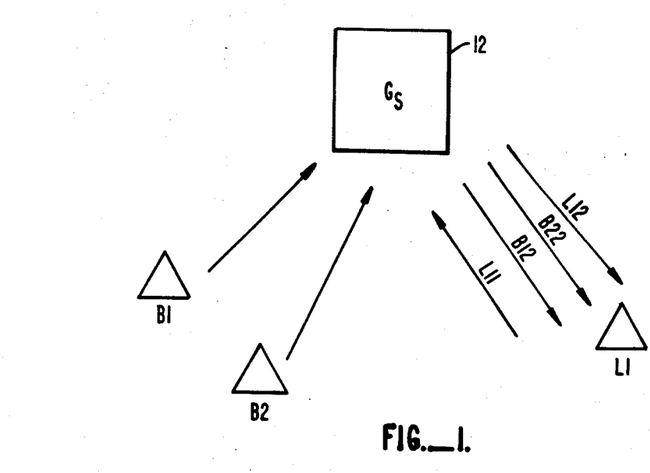
FIG. 1 is a schematic diagram of a satellite communication system.

FIG. 1 is a depiction of a satellite communication system. Referring now to FIG. 1, nodes L1, B1, and B2 are depicted. The satellite communication system may have a larger number of nodes than depicted, but the three nodes depicted are sufficient to illustrate the operation of the invention. Compensation for rain attenuation will be described with respect to a local node L1. However, the compensation system described may be utilized in all nodes of the system.

The communication system also includes a satellite 12 with a transponder, having a nominal gain, $G_S$, on board. The signal paths are defined as follows. Signal path PB(1) includes uplink signal path PB11 from node B1 to the satellite 12 and downlink signal path, PB12, from the satellite to the local node L1. It is to be understood that the retransmitted downlink signals described below will be received at all nodes in the system. However, a given node may not have a receiver turned to the particular frequency band of the downlink signal. Beacon signal path PB(2) includes the uplink signal path PB21 from node B2 to the satellite 12, and the downlink signal path, PB22, from the satellite 12, to local node L1. The local signal path PL(1) includes the uplink signal path, PL11 from the local node L1 to the satellite and the downlink signal path, PL12, from the satellite to the local node. The signal in path PB(1) includes a signal broadcast in the frequency band F(B1), the signal in path PB(2) is broadcast at F(B2), and the signal in path PL(1) is broadcast at F(L1).

During clear sky conditions the received power, RP(L11), of the local uplink signal at the satellite 12 is equal to C11. The nominal gain, $G_S$, of the transponder on board the satellite is set so that the downlink power, $G_S \cdot C11$, is sufficient to overcome rain attenuation at selected ground stations most of the time. However, if RP(L11) is decreased due to rain at L1, then the downlink signal power will also be decreased. This decrease in downlink signal power can cause loss of the downlink signal at nodes experiencing rain. The present invention prevents this decrease in downlink power due to rain at L1 by increasing the power of L11, TR(L11), to compensate for rain attenuation and to maintain RP(L11) near C11.

Nodes B1 and B2 are located at geographical sites having low probability of rainfall and are utilized as beacon sites. The signals from B1 and B2 are utilized as beacons.

The received power of the beacon uplink signal is generally constant because the beacon nodes are located in regions of low rainfall. Accordingly, the transmitted power of the beacon downlink is constant and may be utilized as a reference to determine downlink attenuation.

The following signal path attenuation conditions are defined for a case where rain attenuation is present at the local node L1 but there is no rain present at nodes B1 and B2.

$$L(1) = L11 + dL11 + L12 + dL12$$

$$B(1) = B11 + B12 + dL12$$

$$B(2) = B12 + B22 + dL12$$

In the above equations, the term dL11 represents the magnitude of the rain produced change in attenuation of the uplink signal attenuation, L11, from the local node L1 to the satellite. The quantity dL12 represents the rain produced change in attenuation of the downlink signal attenuation, L12, from the satellite to the local node L1. Note that the path PB(1) includes no uplink attenuation change term because there is no rain at site B1. However, the down link attenuation term is set equal to dL12. Within the accuracy of the present system, the signal level received in the downlink signal path PB12 is set equal to the signal level received in the downlink signal path PL12. The equation for the beacon signal path PB(2) is derived similarly.

The power allocation system of the present invention utilizes measurements which are indicative of changes in the power of the signals transmitted from B1, B2 and L1 and received at the local node L1. In the preferred embodiment, these signal power changes are determined by the difference between a long term average representing the received powers of the signals during non-rain conditions and a short term average, calculated in real time, of the power of the signal received at the local site. These signal power changes are then utilized to calculate a compensation factor. The compensation factor is utilized by a power control loop in the transmitter at the local node L1 to boost the power of the transmitted uplink signal so that the power, RP(L11), of the uplink signal received at the satellite 12 is maintained at a constant level. A constant uplink received power level at the satellite maintains a constant transmitted power level on the satellite downlink thereby insuring the required downlink performance characteristics at all receiving nodes.

The magnitude of the uplink signal fade, dL11, must be determined to compensate for uplink signal fade and maintain the received power, RP(L11), of the received uplink signal at the satellite at a constant level. The quantity dL11 is calculated as follows, where a quantity having a (t) represents the short term or real time value of the quantity and a quantity with a (T) indicates the long term average of the quantity.

$$L(t) = Lr + Le + dL11 + dL12 \text{ and}$$

$$L(t) = Lr + Le + La$$

where $L(t)$ = short term signal level measured at the demodulator at L1.
$L(T)$ = long term signal level measured at the local demodulator.
$Lr$ = received signal level under clear sky conditions.
$Le$ = measurement error introduced by local demod.
$dL11$ = uplink signal attenuation due to local rain.
$dL12$ = downlink signal attenuation due to local rain.
$La$ = error in long term signal level due to local rain.

Note that La is a time varying function dependent on the intensity and duration of local rain.

The signal power change estimate becomes:

$$dL(t) = L(t) - L(T) = dL11 + dL12 - La$$

The advantage of using the local long term estimate is made clear here in that it eliminates the local demodulator measurement error. It must be noted that there is also generated another error, La, as a result of an imperfect local estimate. This is discussed further below.

Using similar notation for the beacon measurements:

$$B1(t) = B1r + B1e + dL12 \text{ and}$$

$$B1(T) = B1r + B1e + B1a$$

The beacon signal power change estimate for the first beacon becomes:

$$dB1(t) = B1(t) - B1(T) = dL12 - B1a$$

For the second beacon:

$$dB2(t) = B2(t) - B2(T) = dL12 - B2a$$

Combining the two beacon signals results in:

$$dB'(t) = [dB1(t) + dB2(t)]/2 = dL12 - [B1a + B2a]/2$$

$$dB'(t) = dL12 - B'a$$

The local signal correction function becomes, $$\begin{aligned} dG(t) &= dL(t) - dB'(t) \\ &= dL11 + dL12 - La - dL12 + B'a \\ &= dL11 - La + B'a \end{aligned}$$

where $dB'(t)$ is the average signal power change estimate for both signals and $B'a$ is the average long term signal level of both beacon signals.

Clearly, $dB1(t)$ may also be utilized to determine the signal correction value, $dG(t)$.

Figure 2:
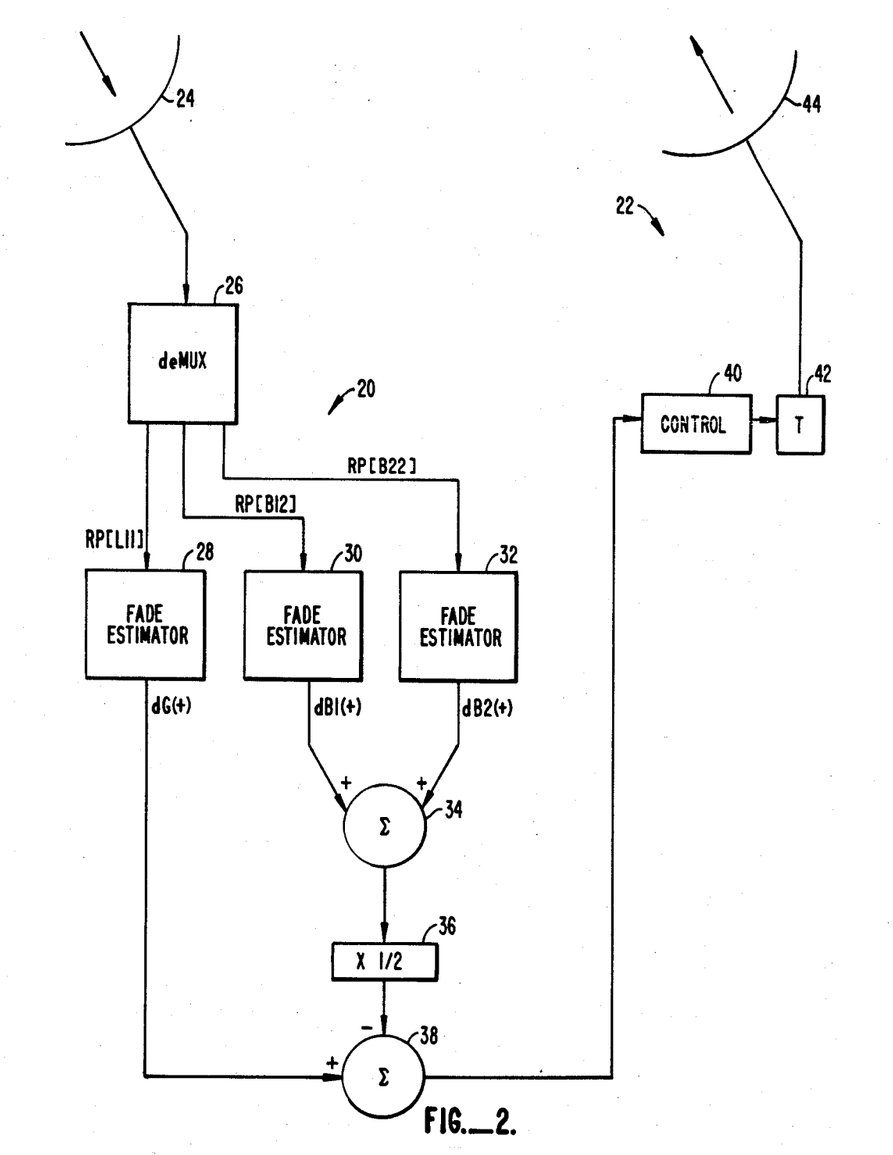
FIG. 2 is a block diagram of an embodiment of the present invention.

FIG. 2 is a block diagram of an uplink power compensation system at local node L1.

For the sake of simplicity and explanation, standard satellite receiving components well known in the art, such as the LNA and down converter are not illustrated. The system is divided into a receiver section 20 and a transmitter section 22. Turning first to the receiving section 20, a receiving antenna 24 receives first, second, and third downlink signals traversing downlink paths PL12, PB12, and PB22, respectively. The received powers at L1 of these signals are RP(L12), RP(B12), and RP(B22), respectively. These downlink signals are routed to the input port of frequency demultiplexer 26. The frequency demultiplexer 26 includes output ports for the first signal at frequency F(L1), for the second signal frequency F(B1), and third signal at frequency F(B2). The first signal is directed to the input port of the local fade measuring unit 28, the second signal is routed to the input port of the B(1) fade measuring unit 30, and the third signal is routed to the input port of the B(2) fade measuring unit 32. The output ports of the B(1) fade measuring unit 30 and B(2) fade measuring unit 32 are routed to sum inputs of first summing element 34.

The output of first summing element 34 is coupled to the input port of multiplier 36. A difference input port of second summing element 38 is coupled to the output of the multiplier 36. The sum input of second summing element 38 is coupled to the output port of the L(1) fade measuring unit 28.

Referring now to the transmitter side 22, a control loop 40 has its error input coupled to the output of the second summing element 38. The control output of the control loop 40 is coupled to a gain adjustment for the local uplink (L11) transmitter 42. The output of the transmitter 42 is coupled to the transmit antenna 44.

The circuitry depicted in FIG. 2 performs the mathematical operations described above. The output of the L(1) fade measuring unit 28 is equal to dL(t), the output of the B(1) signal fade measuring device is equal to dB1(t), and the output of the B(2) signal fade measuring unit 32 is equal to dB2(t). The output of first summing element 34 is equal to dB1+dB2. The multiplier is set to multiply the input by one half so that the output of the multiplier is equal to dB'(t). The second summing element 38 forms the difference between dL and dB'(t) so that its output is equal to dG. The quantity dG is utilized by the control loop 40 to adjust the amplitude of the uplink signal, L11, to compensate for attenuation due to rain.

Figure 3:
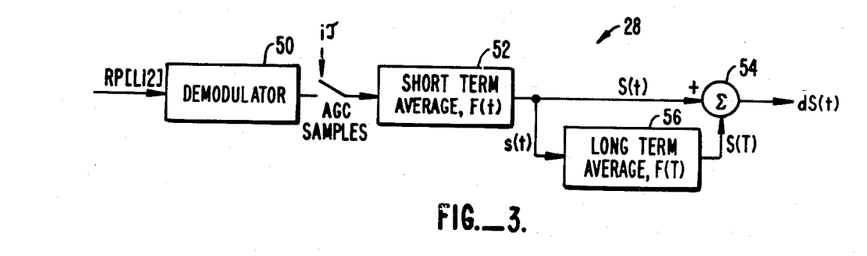
FIG. 3 is a block diagram of a system for measuring signal fade.

FIG. 3 is a block diagram depicting exemplary circuitry for the fade measuring units 28, 30, or 32. Each fade measuring unit 28, 30, 32 samples the automatic gain control (AGC) output of a demodulator 50. The AGC values indicate the strength of the signal received at the local node L1. The sampled AGC values are directed to the input of a short term average calculating unit 52. The quantity calculated by this unit, S(t), is an estimate of real time average value of the power of the incoming signal. The number of samples required to generate a statistically reliable short term average term is discussed below. The output port of the short term average calculating unit 52 is coupled to the sum input of summing element 54 and to the input port of a long term average calculating unit 56. The output of the long term average, S(T̄), calculating unit 56 is coupled to the difference input port of the summing element 54. The signal at the output port of summing element 54 is an estimate of the attenuation of the received signal.

Figure 4:
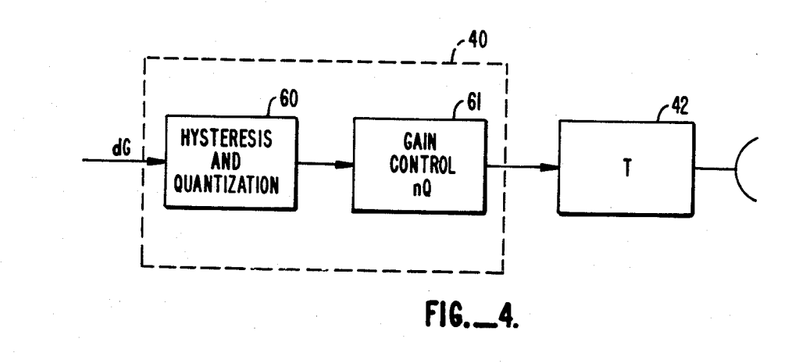
FIG. 4 is a block diagram of the gain control circuit.

The operation of the control loop 40 (FIG. 2) will now be described with reference to FIGS. 4–7. In FIG. 4, a block diagram of the control loop is presented. The error correction signal dG is received by a quantization and hysteresis circuit 60. The output of the quantization and hysteresis circuit 60 is directed to gain control signal generator 61 which generates a quantized gain control signal to adjust the gain of the transmitter 42 (FIG. 2) to a value equal to a multiple of a fixed power increment Q.

Figure 5:
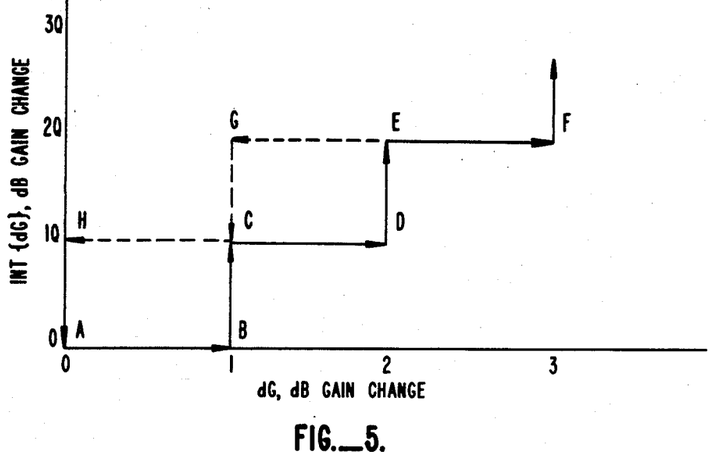
FIG. 5 is a graph illustrating the hysteresis and quantization characteristics of the power control circuit.

The function of the quantization and hysteresis circuit will now be described with reference to FIG. 5. FIG. 5 is a graph depicting the gain change of the transmitter amplifier on the vertical axis and the amplitude of the error correction signal, dG, on the horizontal axis.

Figure 6:
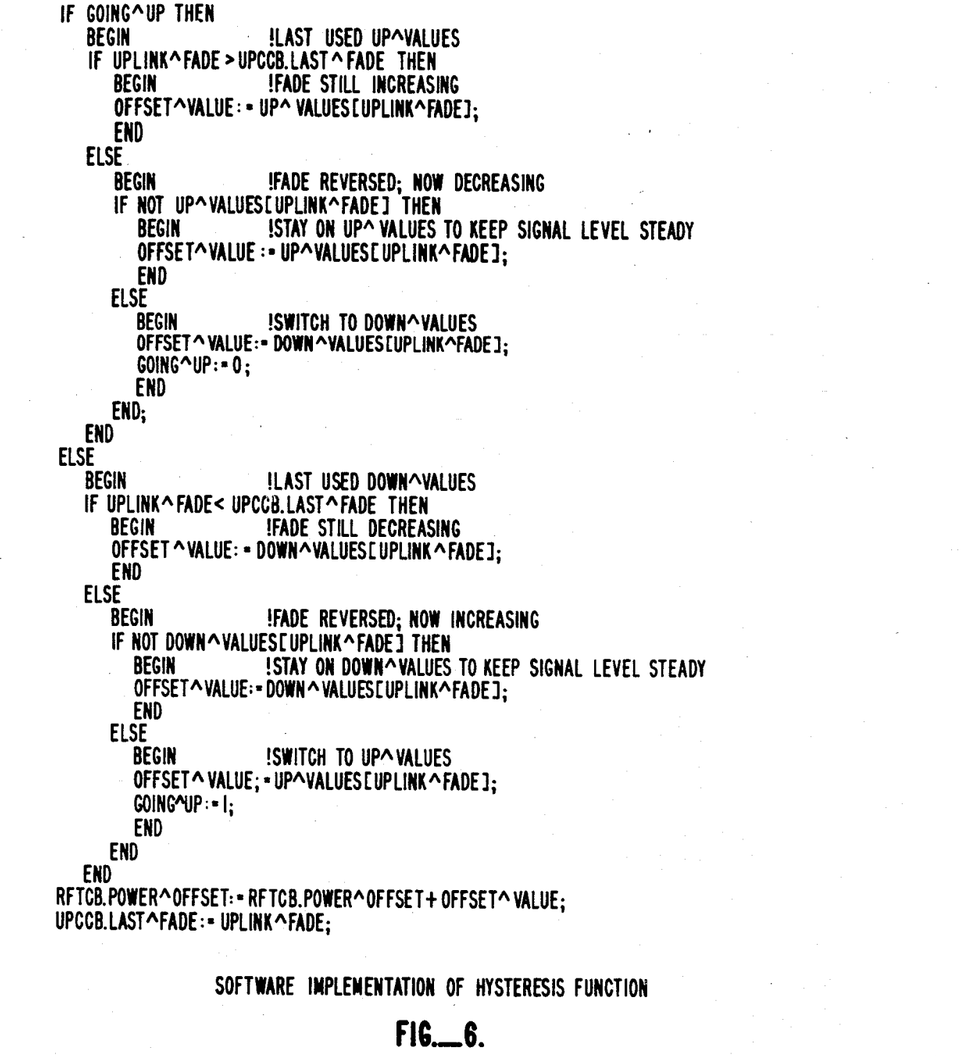
FIG. 6 is a flowchart depicting a hysteresis algorithm.

The error correction signal is quantized utilizing the function $$INT[dG] = INT[dL(t) - (dB1(t) + dB2(t))/2]$$

where the function INT[x] is the integer I where I is less than or equal to x and where x is less than or equal to I+1. The function dG is directly proportional to the estimated uplink rain attenuation. The function INT[dG] is a quantized measure of the estimated rain attenuation and, after further processing, is used as the gain control signal. This further processing causes the signal INT[dG] to have a hysteresis characteristic. FIG. 5 illustrates this hysteresis characteristic. Gain change decision boundaries are identified by the numbers 0, 1Q, 2Q, and 3Q on the vertical scale where Q is the the increment step size by which the gain control will be varied, e.g., Q is equal to 1dB. As the variable INT[dG] increases it will follow the path identified by the solid lines joining the successive points A, B, C, D, E, F, etc. As it decreases, it will follow the path illustrated in part by the successive points E, G, C, H, and A. A typical software implementation of the hysteresis function is illustrated in FIG. 6.

This quantization and hysteresis prevents correction of the gain for the transmitter in the presence of small correction signal variations. For example, consider the point E of FIG. 5. The gain will remain set at 2Q for fluctuations of dG between 1dB and 3dB.

Figure 7:
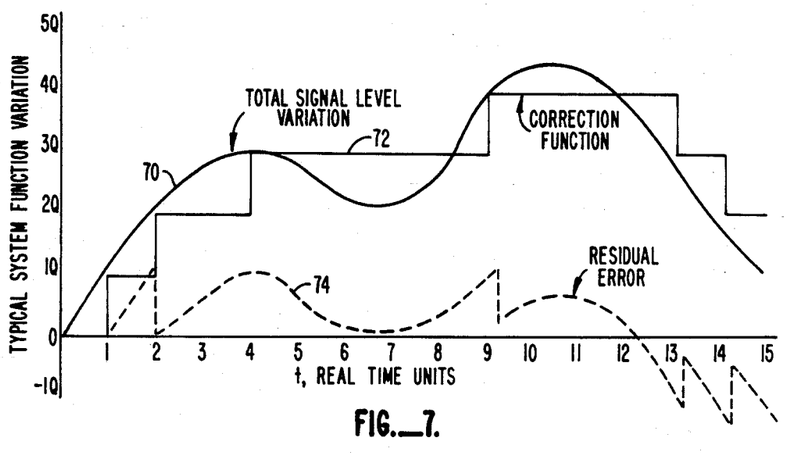
FIG. 7 is a graph depicting signal level variation, the correction function, and the residual error of the control system.

FIG. 7 is a time plot of several power control system functions. The solid curved line 70 represents the signal level variation, dG, in real time. The corrected transmitted gain is represented by the step function 72. Finally, the residual error, i.e., the difference between the actual signal level variation and the transmitter gain set is depicted by the dotted line 74. The residual error function 74 is bounded by the quantization interval Q and −Q.

The calculation of the short and long term averages illustrated in FIG. 3 will now be described. An adjustment to the gain of the transmitter is to take place at time $T_A$. Subsequent adjustments are to take place at $T_A + iT$, where the interval T is determined by the characteristics of the atmospheric attenuation and the index. In the present embodiment T is about ten seconds, which represents an interval over which the uplink fade due to rain attenuation should not exceed one or two dB. The short term averages of the first, second, and third received signals, RP(L12), RP(B12), and RP(B22), are a real time measure of the local received signal levels. These short term averages are utilized to identify rain at the local site and to quantize the uplink attenuation, dL11. The short term averages must be developed over a time interval long enough to provide a useful average of reasonable accuracy and short enough to provide efficiently fast control loop response to effect power compensation before the attenuation increases to a level that causes failure of the node to receive the downlink signal. The short term averages, S(t), are generated over a thirty second to one minute time interval. The different downlink signals are sampled every ten seconds and thus there are six sample periods that are generated over a "sliding window" containing the last six most recent sample periods. The short term average, S(t), may be calculated using a tapped delay line and summation element.

Figure 8:
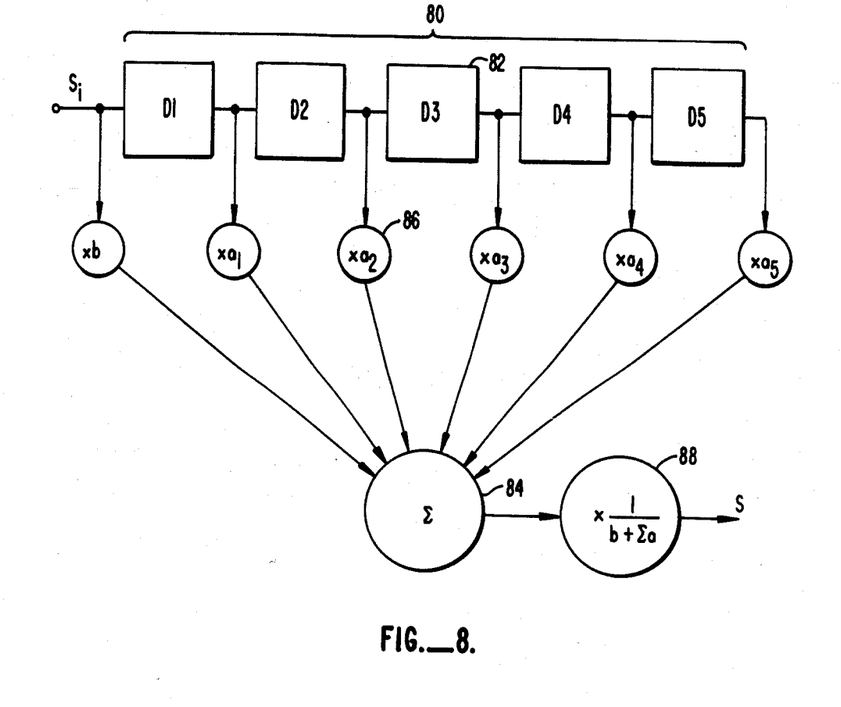
FIG. 8 is a schematic diagram of a circuit for determining an average signal level.

FIG. 8 is a schematic diagram for implementing either the short term or long average calculating units 52 to 56. In FIG. 8 a shift register 80 includes delay elements 82 D1 through D6. The shift register 80 input receives the sampled AGC signals $S_i$. The delay implemented by each delay element is set so that if, at time $T_m$, the AGC value $S_m$ is input to the shift register, then the output of D1 is $S_{m-1}$, of D2 is $S_{m-2}$, of D3 is $S_{m-3}$, of D4 is $S_{m-4}$, and of D5 is $S_{m-5}$.

The output of each delay element is routed to a summing element 84 through a weighting multiplier 86. The output of the summing element 82 is directed the input of a normalizing multiplier 88. The output of the normalizing multiplier 59 is the time average, S. If the weighting values $b_i$ and $a_i$ are all unity, then the output S is a pure average. In the present embodiment, the contribution of the most recently received signals to the average is increased by adjusting the values of the weighting multipliers so that $b > a, > a_2, \ldots > a_5$. The actual values of the weighting multipliers and number of delay elements 82 in the shift register 80 are design choices and not part of the present invention.

The long term average is the average of a series of short term averages taken over a specified time duration. Since the difference between the short term average at time $T_A$ and the long term average is utilized to correct the uplink fade in real time, the long term average must reflect a steady value of the signal power level about which fluctuation can be measured. The time period utilized to calculate the long term average will depend on the system utilized and weather conditions at the local site. For example, the long term errors in local and beacon signal levels due to local rain, La and Ba, may be minimized by excising rain periods from the local average calculation period. An alternative to excising rain data is to make the long term average interval long enough so that the degradation of the long term estimate by rain attenuation is negligible.

In a preferred embodiment, the beacons, B1 and B2, are also communication nodes in the satellite communication system. Accordingly, no dedicated transmitters and receivers are required to establish the reference beacons. These beacons are termed pseudobeacons in contrast to a true reference beacon broadcast from a special transmitter on the satellite.

This pseudo-beacon technique allows existing, data-carrying, links to be utilized as compensation references. Accordingly, no extra transmission or reception equipment is required. The present system processes the AGC signal from the local demodulator to control the gain of the local transmitter.

It should be understood, that the power control system of the present invention may be implemented using a single earth satellite beacon from a nearly ideal climatic location, such as the desert, which would assure very infrequent attenuation variations. Clearly, either dB1(t) or dB2(t) may be utilized to determine the local signal correction function, dG(t).

The short term signal averages may be determined every 30 to 60 seconds. Thus, the cycle time of the control loop is on the order of a minute. This fast cycle time allows compensation to take place before the downlink signal power gets too close to the signal loss threshold. This is an important advantage. If compensation is attempted too close to threshold, the signal may be lost before compensation can be implemented.

The compensation system of the present invention also functions to eliminate system errors due to equipment parameter variations.

For example, all hardware component characteristics will change in time due to aging and temperature. The gain of the uplink equipment, downlink equipment and the satellite equipment will change and effect the measured signal changes. Use of the pseudo-beacon technique is very advantageous in that any changes seen by both the local signal and the beacon signal will cancel out in the mathematics of combining the signals in the control loop. However, parameter changes which are not shared by the two paths are not cancelled. The uncancelled changes are those occurring in both the local and beacon link uplink equipment. It is expected that these changes can significantly exceed 1 dB. Note, however, that these uplink equipment changes will be indistinguishable from rain fade effects and will be compensated for by the power control algorithm within its control capability and range.

It will be appreciated that the power control system of the present invention does not require a central control, as each earth station has its own transmit control. Therefore, in the unfortunate event of the failure of the control at any one earth station, the remainder of the system would not be adversely affected.

The present invention has now been described with reference to preferred embodiments. Variations and substitutions for elements in these embodiments will now be apparent to persons of skill in the art. For example, the details of the short term and long term average calculations may be varied; the invention can be applied to other systems utilizing resource sharing (multiplexing) schemes other than frequency multiplexing, and the invention is not limited to satellite communications but can be utilized in any system operating in a broadcast mode. Accordingly, the scope of the invention is defined by the appended claims.

What is claimed is:

1. In a satellite communication system of the type having a satellite transponder for receiving a plurality of uplink signals transmitted by a set of geographically distributed ground stations on earth and for retransmitting each uplink signal as a corresponding downlink signal, with the signal level of each downlink signal equal to the signal level of the corresponding received uplink signal multiplied by the gain of the satellite transponder, a system for compensating for a change in the received signal level of the satellite of a given local uplink signal comprising:

a local ground station, being a first one of the ground stations in the set, for transmitting said given local uplink signal, which is retransmitted by the satellite as a local downlink signal, and for receiving the downlink signals retransmitted by the satellite;

a first beacon ground station, being a second one of the ground stations in the set located at a first geographical site having a low probability of an atmospheric attenuation event occurring, for transmitting a first beacon uplink signal which is retransmitted by the satellite as a first beacon downlink signal;

means for estimating the change of the signal level of said first beacon downlink signal received at said local ground station during the occurrence of a specific atmospheric attenuation event at said local ground station;

means for estimating the change of the signal level of the local downlink signal received at said local ground station during said given atmospheric attenuation event;

means for calculating the difference between said estimated signal changes of the local downlink signal and the first beacon signal; and means for increasing the signal level of the local uplink signal by about the calculated difference to compensate for uplink attenuation due to the given atmospheric attenuation event at the local ground station.

2. The invention of claim 1 further comprising:

a second beacon station, being a third ground station in said set located at a second geographic site having a low probability of an atmospheric attenuation event occurring, for transmitting a second beacon uplink signal which is retransmitted by the satellite as a second beacon downlink signal;

means for estimating the change of the signal level of the second beacon downlink signal at said local ground station during said given atmospheric attenuation event;

means for calculating the average of the signal level changes of the first and second beacon downlink signals;

and wherein said means for calculating the difference calculates the difference between the signal level change of the local downlink signal and the average of the signal level changes of the first and second beacon signals.

3. The invention of claim 1 wherein said means for estimating the change of the signal level of the local downlink signal comprises:

means for estimating the average signal level of the local downlink signal over a period of time substantially greater than the duration of an atmospheric attenuation event at the local ground station;

means for estimating the signal level of the local downline signal at a given time during said given atmospheric attenuation event; and means for calculating the difference between the average signal level and the signal level at the given time of the local downlink signal.

4. In a satellite communication system of the type having a satellite transponder for receiving a plurality of uplink signals transmitted by a set of geographically distributed ground stations on earth and for retransmitting each uplink signal as a corresponding downlink signal, with the signal level of each downlink signal equal to the signal level of the corresponding received uplink signal multiplied by the gain of the satellite transponder, a system for compensating for a change in the received signal level of the satellite of a given local uplink signal comprising:

a local ground station, being a first one of the ground stations in the set, for transmitting said given local uplink signal, which is retransmitted by the satellite as a local downlink signal, and for receiving the downlink signals retransmitted by the satellite;

a first beacon ground station, being a second one of the ground stations in the set located at a first geographical site having a low probability of an atmospheric attenuation event occurring, for transmitting a first beacon uplink signal which is retransmitted by the satellite as a first beacon downlink signal;

means for estimating the change of the signal level of said first beacon downlink signal received at said local ground station during the occurrence of a specific atmospheric attenuation event at said local ground station;

means for estimating the change of the signal level of the local downlink signal received at said local ground station during said given atmospheric attenuation event; and means for calculating the difference between said estimated signal changes of the local downlink signal and the first beacon signal.

5. A method for allocating power in a satellite transmission system comprising the steps of:

(a) providing a satellite transponder;

(b) providing a set of geographically distributed ground stations;

(c) designating one of said ground stations as a local node;

(d) designating another one of said ground stations, located in a geographical region having a low probability of an atmospheric attenuation event occurring, as a beacon node;

(e) transmitting a local uplink signal from said local node;

(f) transmitting a beacon uplink signal from said beacon node;

(g) receiving said local and beacon uplink signals at said satellite;

(h) amplifying the received uplink signals by a fixed gain constant and retransmitting said amplified beacon uplink signal as a beacon downlink signal and said amplified local uplink signal as a local downlink signal;

(i) receiving said beacon and local downlink signals at said local node;

(j) estimating the non-attenuated average signal level of the received local and beacon downlink signals;

(k) estimating the attenuated signal levels of the received local and beacon downlink signals during a given atmospheric attenuation event; and (l) utilizing the estimated non-attenuated and attenuated signal levels of the local and beacon downlink signals to estimate the attenuation of the local uplink signal during the given atmospheric attenuation event.

6. The invention of claim 5 wherein said step of utilizing comprises the steps of:

(a) calculating the difference between the nonattenuated and attenuated signal levels of the received beacon downlink signal to determine the beacon downlink signal level change;

(b) calculating the difference between the nonattenuated and attenuated signal levels of the received local downlink signal to determine the local downlink signal level change; and (c) calculating the difference between the beacon and local donwlink signal level changes to estimate the attenuation of the local uplink signal due to the local atmospheric attenuation.

7. The invention of claim 5 further comprising the step of:

increasing the signal level of the local uplink signal by an amount substantially equal to the estimated attenuation level of the local uplink signal to compensate for atmospheric attenuation.

8. In a satellite communication system of the type having a satellite transponder for receiving a plurality of uplink signals transmitted by a set of geographically distributed ground stations on earth and for retransmitting each uplink signal as a corresponding downlink signal, with the signal level of each downlink signal equal to the signal level of the corresponding received uplink signal multiplied by the gain of the satellite transponder, where a first one of the ground stations in the set is a local ground station for transmitting a local uplink signal which is retransmitted by the satellite as a local downlink signal and for receiving the downlink signals retransmitted by the satellite, and where a second one of the ground stations in the set, located at a geographical site having a low probability of an atmospheric attenuation event occurring, is a beacon ground station for transmitting a first beacon uplink signal which is retransmitted by the satellite a first beacon downlink signal, a system for compensating for a change in the received signal level, at the satellite, of the local uplink signal comprising:

means for estimating the change of the signal level of the local downlink signal received at said local ground station during said given atmospheric attenuation event;

means for estimating the change of the signal level of first beacon downlink signal received at said local ground station during the occurrence of a specific atmospheric attenuation event at said local ground station;

means for calculating the difference between said estimated signal changes of the local downlink signal and the first beacon signal; and means for increasing the signal level of the local uplink signal by about the calculated difference to compensate for uplink attenuation due to the given atmospheric attenuation event at the local ground station.

* * * * *